(12) United States Patent
Youn et al.

(10) Patent No.: US 7,929,479 B2
(45) Date of Patent: Apr. 19, 2011

(54) METHOD AND SYSTEM FOR MBS OVER MMR NETWORK USING DYNAMIC MODIFICATION OF MCS LEVEL

(75) Inventors: Hee Yong Youn, Seongnam (KR); Chi Hyun Cho, Suwon (KR)

(73) Assignee: Sungkyunkwan University Foundation for Corporate Collaboration (KR)

( * ) Notice: Subject to any disclaimer, the term of this patent is extended or adjusted under 35 U.S.C. 154(b) by 135 days.

(21) Appl. No.: 12/365,142

(22) Filed: Feb. 3, 2009

(65) Prior Publication Data

US 2010/0054141 A1 Mar. 4, 2010

(51) Int. Cl.
*H04B 7/14* (2006.01)
(52) U.S. Cl. ............................................. 370/315; 455/7
(58) Field of Classification Search ........................ None
See application file for complete search history.

(56) References Cited

U.S. PATENT DOCUMENTS

| | | | |
|---|---|---|---|
| 2007/0072600 A1* | 3/2007 | Cho et al. | 455/423 |
| 2007/0081603 A1* | 4/2007 | Jang et al. | 375/260 |
| 2007/0155338 A1* | 7/2007 | Hong et al. | 455/69 |
| 2007/0264932 A1* | 11/2007 | Suh et al. | 455/13.1 |
| 2008/0019321 A1* | 1/2008 | Kim et al. | 370/332 |
| 2008/0045212 A1* | 2/2008 | Kim et al. | 455/435.1 |
| 2008/0108369 A1* | 5/2008 | Visotsky et al. | 455/455 |
| 2008/0125032 A1* | 5/2008 | Jung et al. | 455/7 |
| 2010/0008284 A1* | 1/2010 | Chae et al. | 370/315 |

OTHER PUBLICATIONS

Cho et al., "*Mobile Multi-hop Relay System using AMC for Multicast Broadcast Service over Mobile WiMAX*", Wireless Telecommunication Symposium 2008 Papers, Apr. 26, 2008.
Shrestha et al., "*New Approaches for Relay Selection in IEEE 802.16 Mobile Multi-hop Relay Networks*", in Proc. Euro-par 2007, pp. 950-959, Aug. 2007.
Erwu et al., "*Performance Evaluation of Bandwidth Allocation in 802.16j Mobile Multi-hop Relay Networks*", in Proc. The 65th IEEE VTC2007-Spring, Apr. 2007.

* cited by examiner

*Primary Examiner* — Ricky Ngo
*Assistant Examiner* — Clemence Han
(74) *Attorney, Agent, or Firm* — Martine Penilla & Gencarella, LLP (57) ABSTRACT

A method and system for Multicast Broadcast Service (MBS) over Mobile Multi-hop Relay (MMR) network using dynamic modification of Modulation and Coding Scheme (MCS) level are provided. The method comprises deciding MCS level for transmission between base station (BS) and relay station (RS), deciding MCS level for transmission between the BS and RS, and transmitting an MCS control message to the RS informing of the MCS level for transmission between the RS and the MS comprises calculating spectrum efficiency of the MS (ME), and selecting MCS level corresponding to the ME as optimum MCS level for the transmission between the RS and the MS.

9 Claims, 6 Drawing Sheets

METHOD AND SYSTEM FOR MBS OVER MMR NETWORK USING DYNAMIC MODIFICATION OF MCS LEVEL

CLAIM OF PRIORITY

The present application is claiming foreign priority of Korean Patent Application No. 10-2008-0085920, filed on Sep. 1, 2008, the content of which is incorporated herein by reference.

BACKGROUND OF THE INVENTION

1. Field of the Invention

The present invention relates to a method and system for Multicast Broadcast Service (MBS) over Mobile Multi-hop Relay (MMR) network using dynamic modification of Modulation and Coding Scheme (MCS) level. More particularly, the present invention relates to a method and system for MBS over MMR network using dynamic modification of MCS level that offers high quality services on mobile WiMAX by dynamically modifying the MCS level for the transmission between Relay Station (RS) and mobile station (MS) based on the MCS level for the transmission between the Base Station (BS) and the RS which can be periodically updated.

2. Description of the Related Art

Recently, demands for various broadcast service have been increasing in wireless communication environment. In order to provide high quality broadcast service such as live broadcast, hook-up, real-time video service, etc., reliability and high data throughput are required and thus it is necessary for wireless communication environment to have enough system resources such as bandwidth as wired communication environment has. However, wireless communication environment such as mobile WiMAX uses expensive wireless system resources and thus services provided by such wireless communication environment are limited.

MBS based on IEEE802.16e standard provides service that can overcome these problems. The MBS is introduced to make many mobile users effectively use limited systems sources through shared channel. However, the MBS has disadvantages that it is possible to not provide enough quality service to the mobile stations that are located far from the base station or particularly at the edge of the cell. It is because, as the distance from the base station gets bigger, Carrier to Interference and Noise Ratio (CINR) gets lower and low data throughput due to the lowered CINR lowers the service quality. That is, MBS data throughput significantly depends on the channel condition. The existing MBS system provides service based on the lowest CINR measured between the base station and the mobile stations so that the throughput is limited. Accordingly, it is noted that, although the MBS is useful technology capable of simultaneously transmitting data to many mobile users by effectively taking advantage of the limited system resources, the MBS has disadvantages that it is difficult to provide stable service quality with enough data throughput to all mobile users.

Mobile WiMAX system for supporting MBS needs to include MBS controller for controlling various information and MBS contents server transmitting encoded MBS contents data, etc. Also, it is necessary to include MBS zone, which is a group of base stations serving synchronized MBS contents data to mobile stations. The MBS zone supports the MBS system by being operated with the single frequency. It is also obvious to people skilled in the art that multiple MBS zones are also feasible.

Mobile WiMAX system can transmit data to a target mobile station using a 16-bit connection ID (CID) in MAC layer. It also supports macro diversity, which improves the probability of successful data reception and reduces power consumption and overall interference.

Recently, many studies to solve problems of service quality deterioration due to low data throughput are under progress by IEEE802.16j project group. The IEEE802.16j project group considers using the MMR technology in the IEEE802.16 standard-based system to expand the service coverage and improve data throughput. Relaying technology to maintain the existing point-to-multipoint (PMP) frame structure defined in IEEE802.16e standard is being studied for the expansion of the service coverage through relay stations and another technology to effectively use the MCS level is being studied for the enhancement of the data throughput.

In the IEEE802.16j MMR network, there are three types of relaying concept such as fixed relay station (FRS), nomadic relay station (NRS), and mobile relay station (MRS). First, the FRS is installed and used in a fixed location where reception from the base station is difficult or reception distance should be expanded. Second, the NRS is installed and used in a place where mobile users temporarily gather, in order to prevent temporary load on the system. Third, the MRS is installed and used in mobile transportations such as bus and train, etc. to provide stable service to mobile users on the move. Due to the introduction of such relay systems, it is possible to offer service with guaranteed quality to mobile users regardless of time and place.

Adaptive Modulation and Coding (AMC) scheme is to selectively choose the MCS level appropriate for the current channel condition and the employment of the AMC scheme significantly improves performance of the overall system. The AMC scheme is also to selectively choose the appropriate MCS level considering the average channel condition of the all users. The AMC scheme is developed to guarantee high spectrum efficiency despite variation of channel conditions and it is one of important standard technologies of the wireless communication system. The main feature of the AMC scheme is to dynamically select the MCS level for frames to be able to adaptively modify the overall spectrum efficiency according to the channel conditions. In connection with this, the mobile stations transmit feedback information to the base station in response to the frames transmitted through the channel and thus it is possible to decide the appropriate MCS level.

The mobile WiMAX system supports various MCS levels which can be modified depending on the channel conditions. The mobile stations provide the feedback information regarding quality of the downlink channel to the base station through channel quality indicator (CQI). In order to check quality of the uplink channel, the base station checks the channel condition through the signal that the base station receives. Then, AMC scheduler decides appropriate MCS level based on the quality of the uplink channel and the downlink channel. In the downlink mode, the Mobile WiMAX system uses three types of modulation: Quadrature Phase Shift Keying (QPSK), 16 Quadrature Amplitude Modulation (QAM), and 64QAM. The modulation scheme, combined with the coding scheme, is used as Modulation and Coding Scheme levels. With suitable modification of the MCS levels depending on the channel conditions, it becomes possible to achieve high data throughput.

In the mobile WiMAX system, mobile stations in the same location use the identical MCS level and the low order MCS level is used as the channel condition gets worse due to the increase of the distance from the base station.

Figure 1:
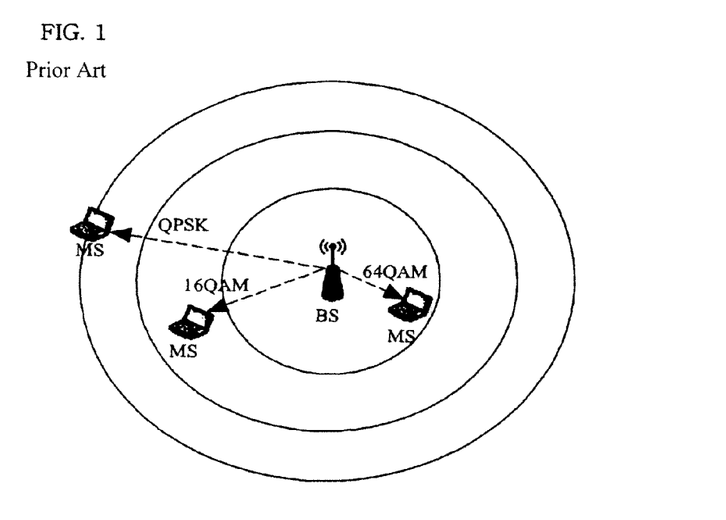
FIG. 1 illustrates application of different MCS levels depending on locations of MSs.

FIG. 1 illustrates application of different MCS levels depending on locations of MSs.

Channel conditions are reported through channel quality indicator channel (CQICH) from mobile stations so that reception condition of the mobile stations can be checked. The CQICH is allocated to the mobile stations using the control IE. It is used to report the downlink CINR for either diversity sub-channels or band AMC sub-channels.

According to AMC scheme in the mobile WiMAX system, the receiver side asks for MCS level with which it wishes to receive MBS data based on the MCS level and the CINR of the current channel. However, it is impossible to find the most adequate MCS level only with the measurement of the CINR of the current channel. It is because, according to the AMC scheme, it is hard to determine the adequate MCS level with one step while it is possible to relatively higher or lower the MCS level based on the measured CINR. Further, it is not possible to provide stable service in an environment where a number of mobile stations simultaneously receive MBS data.

SUMMARY OF THE INVENTION

It is, therefore, an object of the present invention to provide a method and system for MBS over MMR network using dynamic modification of MCS level In accordance with one aspect of the present invention, there is provided a method for Multicast Broadcast Service (MBS) over Mobile Multi-hop Relay (MMR) network using dynamic modification of Modulation and Coding Scheme (MCS) level, comprising: deciding MCS level for transmission between base station (BS) and relay station (RS); deciding MCS level for transmission between the RS and mobile station (MS) based on the MCS level for transmission between the BS and the RS; and transmitting an MCS control message to the RS informing of the MCS level for transmission between the RS and the MS.

Preferably, said deciding the MCS level for the transmission between the BS and RS may comprise: transmitting test MBS data with a plurality of MCS levels from the BS to the RS; and measuring throughputs in response to the test MBS data with the plurality of MCS levels, calculating spectrum efficiencies based on the measured throughputs, and selecting the MCS level corresponding to highest spectrum efficiency among spectrum efficiencies of the current channel as optimum MCS level for the transmission between the BS and the RS.

Preferably, the decided MCS level for the transmission between the BS and RS, throughput and spectrum efficiency may be recorded in Adaptive Modulation and Coding (AMC) table of the BS, and the AMC table may be updated based on the BS's periodical transmission of the test MBS data to the RS and the RS's periodical reports of throughput of the channel to the BS.

Preferably, said deciding MCS level for transmission between the RS and mobile station (MS) may comprise: calculating spectrum efficiency of the MS (ME) using Equation below based on spectrum efficiency of the RSi (REi) corresponding to the decided MCS level for transmission between the BS and the RS and throughput of the overall MBS system (MBSthr); and selecting MCS level corresponding to the ME as optimum MCS level for the transmission between the RS and the MS.

$$MBS_{thr} = \left(\sum_{i=o}^{n-1} RB_i + MB\right) \times \left(\frac{1}{ME} + \sum_{i=0}^{n-1} \frac{1}{RE_i}\right)^{-1}$$

where RBi denotes bandwidth for RSi and MB denotes bandwidth for MS.

Preferably, the decided MCS level for the transmission between the RS and MS, throughput corresponding to the decided MCS level and spectrum efficiency corresponding to the decided MCS level may be recorded in Dynamic Modulation and Coding (DMC) table of the BS, and the DMC table may be updated upon the modification of the MCS level for the transmission between the BS and RS.

Preferably, the MCS level for the transmission between the RS and MS may be decided such that the sum of ME and RE is constant.

Preferably, the method may further comprise: gathering channel information through Channel Quality Information Channel (CQICH); and transmitting MBS data based on the MCS control message.

In accordance with another aspect of the present invention, there is provided a system for Multicast Broadcast Service (MBS) over Mobile Multi-hop Relay (MMR) network using dynamic modification of Modulation and Coding Scheme (MCS) level, wherein the base station (BS) may comprise: Adaptive Modulation and Coding (AMC) table for storing the MCS level for the transmission between the BS and relay station (RS), throughput corresponding to the MCS level, and spectrum efficiency corresponding to the MCS level; and Dynamic Modulation and Coding (DMC) table for storing the MCS level for the transmission between the RS and MS to be changed upon update of the AMC table, and if there is any change of the MCS level for the transmission between the RS and MS, the BS may transmit a MCS control message to the RS informing of the MCS level change such that MBS data is transmitted with the changed MCS level.

Preferably, the BS may transmit test MBS data with a plurality of MCS levels to RS and select the MCS level corresponding to highest spectrum efficiency among spectrum efficiencies of the current channel based on throughputs measured in response to the test MBS data as optimum MCS level for the transmission between the BS and the RS.

Preferably, the BS may calculate spectrum efficiency of the MS (ME) using Equation below based on spectrum efficiency of the RSi (REi) corresponding to the decided MCS level for transmission between the BS and the RS and throughput of the overall MBS system (MBSthr); and select MCS level corresponding to the ME as optimum MCS level for the transmission between the RS and the MS.

$$MBS_{thr} = \left(\sum_{i=o}^{n-1} RB_i + MB\right) \times \left(\frac{1}{ME} + \sum_{i=0}^{n-1} \frac{1}{RE_i}\right)^{-1}$$

where RBi denotes bandwidth for RSi and MB denotes bandwidth for MS.

Preferably, the MCS level for the transmission between the RS and MS may be decided such that the sum of ME and RE is constant.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Since many alternatives, modifications and variations can be made from the present invention, preferred embodiments of the present invention will now be described in detail with reference to the accompanying drawings. However, one should understand that it is not intended to be limiting, but embrace all modification, equivalents or substitutions included in the scope and technical field of the present invention. In the following description, well-known functions or constitutions will not be described in detail if they would obscure the invention in unnecessary detail.

Although terms like the first, the second, etc., may be used for explaining diverse elements, the elements are not to be limited by the terms. The terms are used only for distinguishing one element from another.

The terminology used in this application is used simply for explaining particular embodiments, and is not intended to limit the scope of the present invention in any way. As used throughout this disclosure, the singular forms include plural reference unless the context clearly indicates otherwise. Also, it should be understood that the expression of "comprise" or "include" in this disclosure is to designate the existence of features, numbers, steps, operations, elements, parts or combinations thereof that are described in the specification, and does not eliminate beforehand the existence of one or more of other features, numbers, steps, operations, elements, parts, or combinations of thereof or the possibility of addition.

Hereinafter, preferred embodiments of the present invention will now be described with reference to the accompanying drawings. For a more complete understanding of the present invention and the advantages thereof, like reference numerals represent like parts even in different drawings.

Before getting into further details on the drawings, it is necessary to clarify that components described in this specification are divided by primary function each component is responsible for. That is, two or more components to be described below may be incorporated into one component, or one component may be differentiated into more than two by itemized function. In addition, any person skilled in the art may understand that each component may perform, besides its primary function, part or all of functions of another component additionally, and part of the primary function each component is responsible for may be carried out by another component. Therefore, it is important to note whether all components that are explained throughout this specification exist or not should be interpreted in terms of function, and for this reason the configuration of components of MBS system in accordance with the present invention may differ from that of FIG. 2 within the scope for achieving the foregoing objectives of the present invention.

Figure 2:
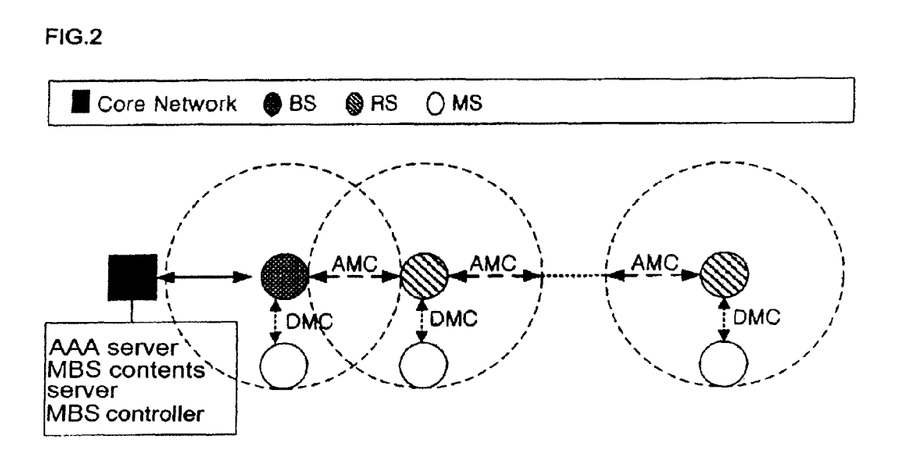
FIG. 2 illustrates the structure of MBS system over MMR network using dynamic modification of the MCS level in accordance with one embodiment of the present invention.

FIG. 2 illustrates the structure of MBS system over MMR network using dynamic modification of the MCS level in accordance with one embodiment of the present invention.

In the existing MBS system, AMC scheme is employed only in the transmission between the BS and RS and the MCS level for the transmission between RS and MSs is fixed. However, the MBS system according to the present invention introduces RS into the mobile WiMAX system based on IEEE802.16e, continuously checks the channel condition using CQICH, changes the MCS level for the transmission between the BS and RS if the MCS level is to be changed and changes the MCS level for the transmission between RS and MS based on the changed MCS level for the transmission between the BS and RS. Accordingly, the MBS system according to the present invention guarantees the stable service quality.

In the MBS system according to the present invention, RS is located and fixed at the location where it is possible to stably receive the MBS data with all MCS levels of the BS. The BS can select the optimum MCS level using AMC scheme that guarantees the maximum throughput, depending on the channel conditions, and RS decides the MCS level for stable transmission of MBS data between RS and MS by dynamic modification of the MCS level according to the present invention. For this, it is required that MSs are wirelessly connected to the BS through RS for mutual information exchange and MSs can report the channel condition to the BS.

As described above, the main purpose of introduction of the MBS system over MMR network using dynamic modification of the MCS level is to guarantee the successful data transmission to MSs located even in the edge of the cell by solving problems caused by use of fixed MCS level. Further, the MBS system over MMR network using dynamic modification of the MCS level according to the present invention provides high quality service by improving low data throughput of the existing MBS system and by maintaining stable data throughput during MBS data transmission. The dynamic modification of the MCS level according to the present invention is performed based on the calculation of spectrum efficiency and throughput and guarantees quality of service (QoS) of the MBS system.

Figure 3:
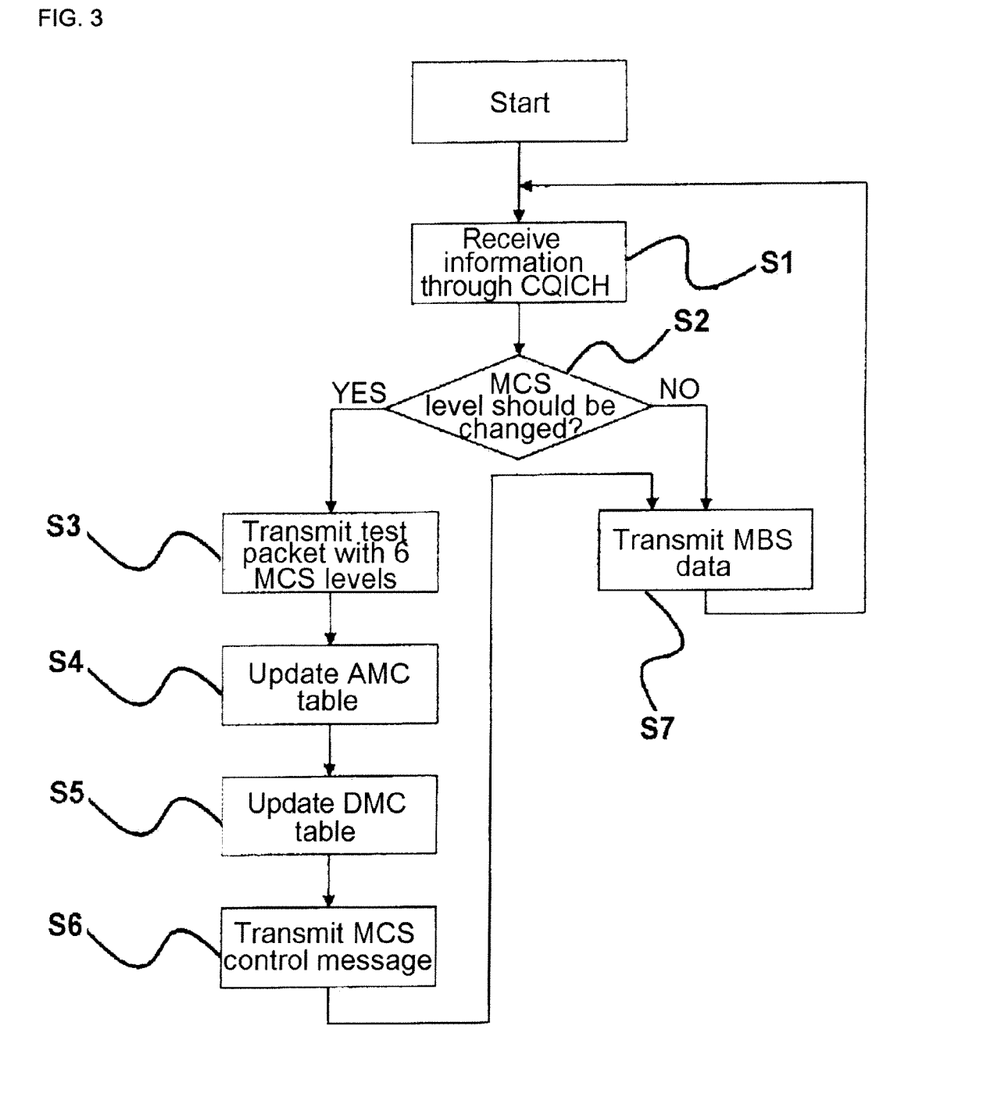
FIG. 3 is a flow chart for explaining a method for MBS over MMR network using dynamic modification of MCS level in accordance with one embodiment of the present invention.

FIG. 3 is a flow chart for explaining a method for MBS over MMR network using dynamic modification of MCS level in accordance with one embodiment of the present invention.

Referring to FIG. 3, in step S1, the BS receives information on channel condition through CQICH at a predetermined period.

Here, RS to which a MS get accessed may be placed outside the radio range of the BS. In accordance with this embodiment of the present invention, the RS forms MMR network. Therefore, information on the channel condition of the RS can be sent to the BS through the information exchange with other RSs connected through the MMR network.

Next, in step S2, the BS decides, based on the received information of the channel condition of the RS, whether the current MCS level should be updated.

In detail, the information on the channel condition may include at least one of a group consisting of throughput values between the BS and the RS that is measured by the RS and/or spectrum efficiency values on the current channel. As such, the BS, based on the throughput values and/or the spectrum efficiency values extracted from the information on the channel condition, may decide to update the MCS level, if the extracted value is below a predetermined value.

For instance, if the extracted throughput value is greater than a predetermined threshold throughput value (for example, throughput values corresponding to other MCS levels which is not used currently), the BS regards the channel condition between the BS and the RS as satisfactory. In this case, the BS does not update the MCS level and uses the existing MCS level.

Meanwhile, if the extracted throughput value is less than a predetermined threshold throughput value, the BS regards the channel condition between the BS and the RS unsatisfactory. In this case, the BS decides to update the MCS level for more efficient application of AMC.

If, in step S2, the BS decides not to update the MCS level (NO in S2), in step S7, the BS transmits MBS data with the existing MCS level to the RS.

However, if, in step S2, the BS decides to update the MCS level (YES in S2), the BS, in step S3, transmits test MBS data of plural MCS levels to the RS. For example, the BS can transmit test MBS data with a plurality of (for example, six) MCS levels to the RS. Here, six MCS levels comprises: QPSK1/2, QPSK3/4, 16QAM1/2, 16QAM3/4, 64QAM2/3 and 64QAM3/4.

The RS reports to the BS channel condition (i.e., throughputs) corresponding to each MCS level. The BS makes AMC table with the MCS levels, throughputs corresponding to the MCS levels, and spectrum efficiencies corresponding to the MCS levels. Among the MCS levels, the MCS level with the highest spectrum efficiency is selected as the most appropriate MCS level for the transmission between the BS and RS. In this regard, the most appropriate MCS level is decided by the BS's transmission of the test MBS data to RS and the RS's feedback and recorded in the AMC table.

Next, in step S4, the MCS level recorded in the AMC table can be changed and the AMC table can thus be updated. In detail, the channel condition is periodically reported to the BS and the AMC table is updated when newly measured spectrum efficiency is lower than spectrum efficiency corresponding to another MCS level which is not used currently. In order to decide the most appropriate MCS level under changed channel conditions, the BS sends test MBS data to RS, receives from the RS feedback information in response to the test MBS data with six different MCS levels and updates the AMC table. In a process of updating the AMC table, spectrum efficiencies corresponding to each MCS level are calculated.

In Step S5, spectrum efficiency of mobile station ME is calculated through Equation 3 to be explained later based on spectrum efficiency of RSi corresponding to the decided MCS level for transmission between the BS and RS and the throughput of the overall MBS system MBSthr. The MCS level corresponding to the calculated spectrum efficiency ME is selected as the most appropriate MCS level for transmission between RS and MS and recorded in DMC table. The DMC table is updated as the AMC table is updated.

Next, in step S6, the BS transmits an MCS control message including information on the updated MCS level in the DMC table to the RS. The MCS control message informs RS of the updated MCS level.

In step S7, the BS transmits MBS data with the updated MCS levels through RS to MSs. MSs report each channel condition to the BS at the same time. However, it is not possible to transmit MBS data with various MCS levels appropriate for transmissions to every MS. Accordingly, the MBS system according to the present invention is designed to guarantee the highest throughput in the transmission between the BS and RS and QoS in the transmission between RS and MSs. For example, if the MCS level of the BS is changed due to the changed condition of channel between the BS and RS, in order to maintain previous throughput, the MCS level of RS is dynamically changed according to the spectrum efficiency. Through this mechanism, in the MBS such as live broadcast, hook-up, and VOD whose QoS should be guaranteed, better MBS data throughput is guaranteed and stable service is provided to MSs.

RS relays traffic and supports access of users and transmission of control and management message. The BS transmits the MBS data with the same throughput to all MSs.

Referring to the network configuration illustrated in FIG. 2, the overall bandwidth (OB) of the MBS system according to the present invention can be expressed as Equation 1, where n denotes the number of RS, RBi denotes the bandwidth between the (i−1)th RS and the (i)th RS, and RB0 denotes the bandwidth between the BS and the first RS. Although MB denotes the bandwidth between MS and the RS or BS, a fixed bandwidth is used for the MB regardless of the number of MS since one spectrum bandwidth is shared in the MBS system.

Hence, the OB for MBS can be written as:

$$OB = \sum_{i=0}^{n-1} RB_i + MB \quad (1)$$

The spectrum efficiency refers to a maximum amount of data that can be transmitted over a given bandwidth in the wireless communication network, and it is measured in bit/s/Hz. The current spectrum efficiency is calculated by transmitted data packets from the BS to the RS for the measurement of current channel condition.

The bandwidth for relay station RBi and the bandwidth for mobile station MB in MBS can then be written as:

$$RB_i = \frac{OB}{\frac{1}{ME} + \sum_{i=0}^{n-1} \frac{1}{RE_i}} \times \frac{1}{RE_i}, \quad (2)$$

$$MB = \frac{OB}{\frac{1}{ME} + \sum_{i=0}^{n-1} \frac{1}{RE_i}} \times \frac{1}{ME}.$$

REi denotes current spectrum efficiency of the (i)th RS, and ME denotes current spectrum efficiency of the MS.

Using Equation (2), the throughput value of overall MBS system can be written as:

$$MBS_{thr} = \left( \sum_{i=o}^{n-1} RB_i + MB \right) \times \left( \frac{1}{ME} + \sum_{i=0}^{n-1} \frac{1}{RE_i} \right)^{-1} \quad (3)$$

The spectrum efficiency of the overall RS in mobile n-hop relay network can be written as:

$$RE = \left(\sum_{i=0}^{n-1} \frac{1}{RE_i}\right)^{-1} \quad (4)$$

In Equation (4), RE denotes the spectrum efficiency of the overall RS and REi denotes the current spectrum efficiency that is measured at the RS and is reported to the BS. This is used to decide the MCS level appropriate for transmission of MBS data from the RS. Using Equation (4), the relation between the MBS data throughput and the spectrum efficiency can be written as:

$$MBS_{thr} \propto (ME+RE) \quad (5)$$

Equation (5) describes the relation between RE and ME for assuring QoS when the MBS throughput value is constant. In the MBS system according to the present invention, the current spectrum efficiency of the RS and MS are used as factors for controlling the MBS throughput while OB value is fixed. Generally, high spectrum efficiency achieved by high order MCS level allows high throughput. However, higher order MCS level does not always guarantee higher throughput. This is because the throughput is significantly affected by channel condition more than the MCS level. For high MBS throughput, therefore, high spectrum efficiency for the RS is needed in the current channel condition. For stable MBS throughput, it is preferable to decide the MCS level based on the relation between RE and ME.

Network Simulator 2 version 2.29 is used to compare the performance of the MBS system according to the present invention and the performance of the existing MBS system, and the mobile WiMAX system based on IEEE802.16e library and IEEE802.16j is implemented for the simulation. Further, the FRS which is studied by IEEE802.16j MMR project group is implemented.

Figure 4:
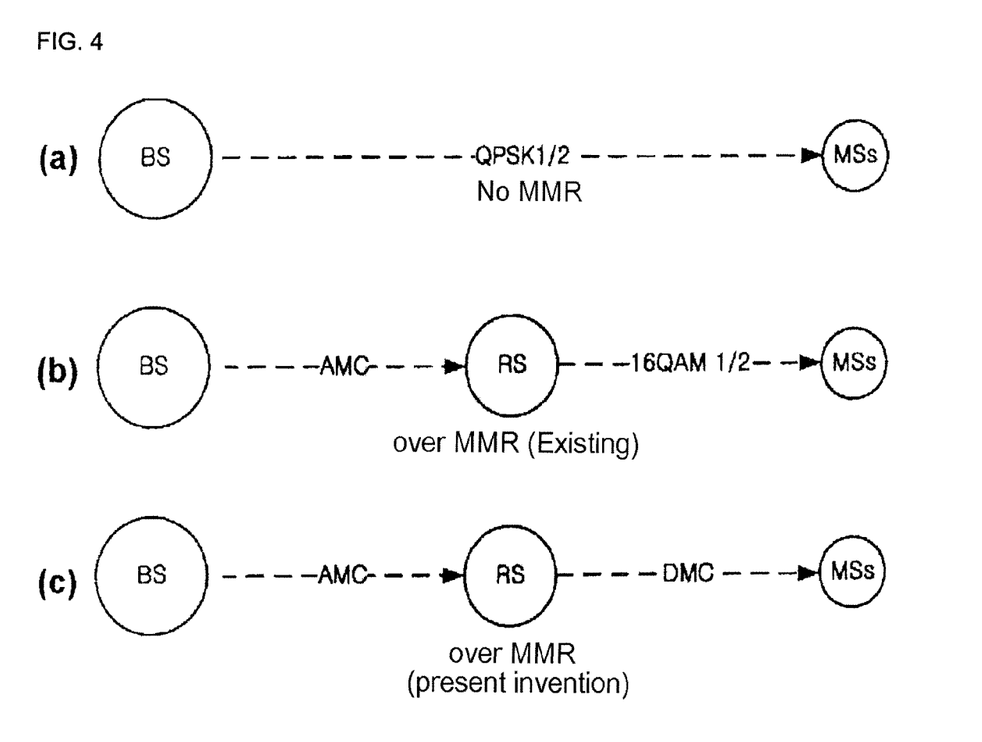
FIG. 4 illustrates experimental environment for analyzing the performance of the MBS system according to the present invention and the performance of the existing MBS systems.

FIG. 4 illustrates experimental environment for analyzing the performance of the MBS system according to the present invention and the performance of the existing MBS systems. FIG. 4 illustrates MBS data transmission on downlink channel.

FIG. 4(a) illustrates the existing MBS system with no RS, FIG. 4(b) illustrates the existing MBS system over MMR network employing the AMC scheme only between the BS and RS, and FIG. 4(c) illustrates the MBS system over MMR network according to the present invention respectively employing the AMC scheme between the BS and RS and the DMC scheme between RS and MS.

The MCS level of the existing MBS system illustrated in FIG. 4(a) is QPSK1/2 which allows stable data delivery to the MSs regardless of the location in the cell but has low throughput. Although, in the existing MBS system illustrated in FIG. 4(b), higher throughput can be obtained by selectively using the MCS level due to the benefit of the expanded coverage through RS, the most stable MBS data throughput is guaranteed by employing the DMC scheme between RS and MS unlike the existing MBS systems illustrated in FIG. 4(a) and FIG. 4(b).

Figure 5:
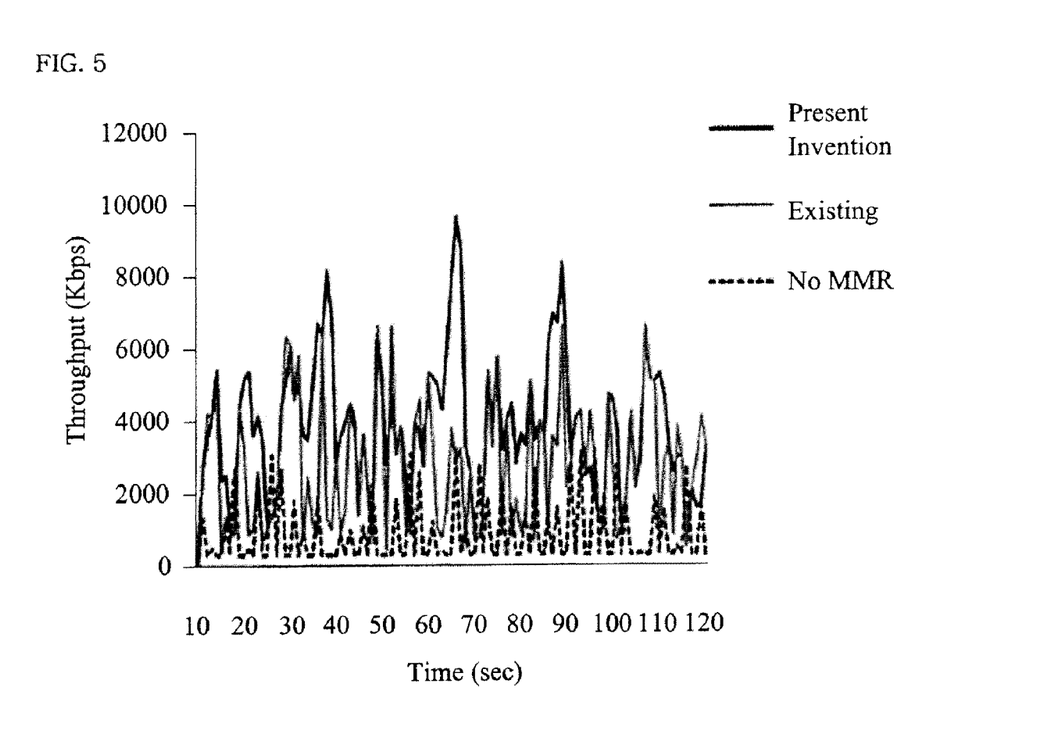
FIG. 5 illustrates throughputs of the MBS system according to the present invention, the existing MBS system with no RS and the existing MBS system over the MMR network as time moves.

FIG. 5 illustrates throughputs of the MBS system according to the present invention, the existing MBS system with no RS and the existing MBS system over the MMR network as time moves.

According to FIG. 5, it is noted that MBS data throughput of the MBS system according to the present invention is significantly improved comparing with the MBS data throughput of the existing MBS systems. The average throughputs of the MBS system according to the present invention, the existing MBS system with no RS and the existing MBS system over MMR network are 3,817 Kbps, 889 Kbps and 2,759 Kbps. The throughput offered by the MBS system according to the present invention is about 3 times of the throughput of the existing MBS system with no RS and the throughput offered by the MBS system according to the present invention is improved about 38% than the existing MBS system over MMR network.

Figure 6:
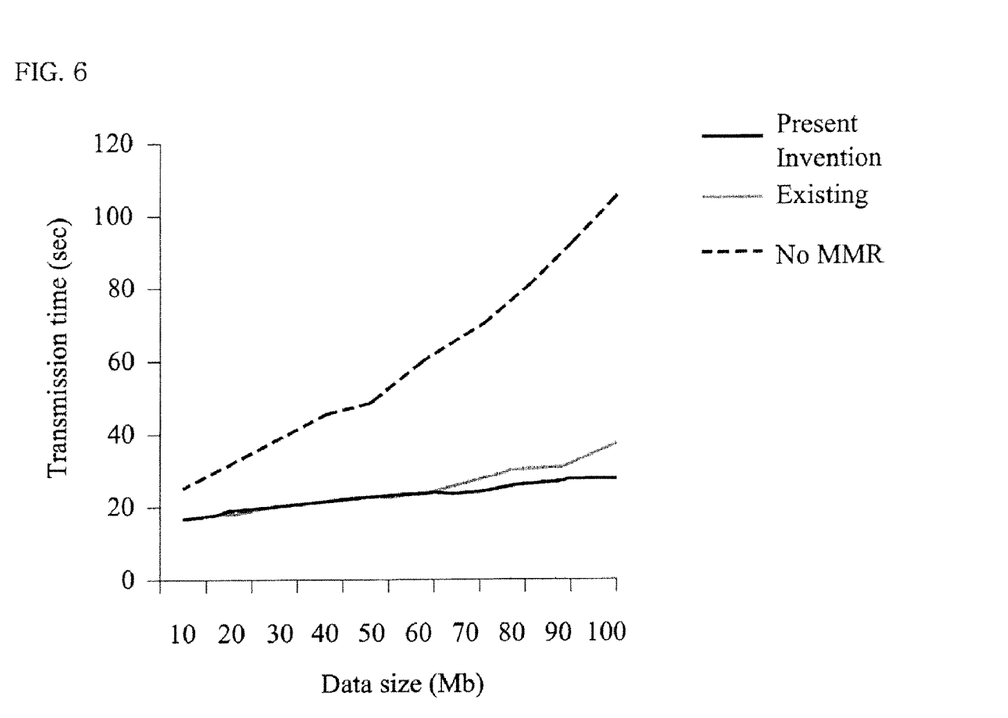
FIG. 6 illustrates a graph comparing the transmission time of the MBS system according to the present invention, the existing MBS system with no RS and the existing MBS system over MMR network for different packet sizes up to 100 Mb.

FIG. 6 illustrates a graph comparing the transmission time of the MBS system according to the present invention, the existing MBS system with no RS and the existing MBS system over MMR network for different packet sizes up to 100 Mb. FIG. 6 illustrates that, when transmitting the MBS data whose size is bigger than 60 Mb, the MBS system according to the present invention requires smaller transmission time than the existing MBS system over MMR network. Further, it is illustrated that, the MBS system according to the present invention maintains constant level of transmission time regardless of the size of the MBS data while the transmission time of the existing MBS system with no RS increases as size of MBS data increases. FIG. 6 illustrates that the MBS system according to the present invention offers higher throughput than that of the existing MBS systems. Further, almost constant transmission time maintained by the MBS system according to the present invention means that the MBS system according to the present invention guarantees stable MBS data transmission.

Figure 7:
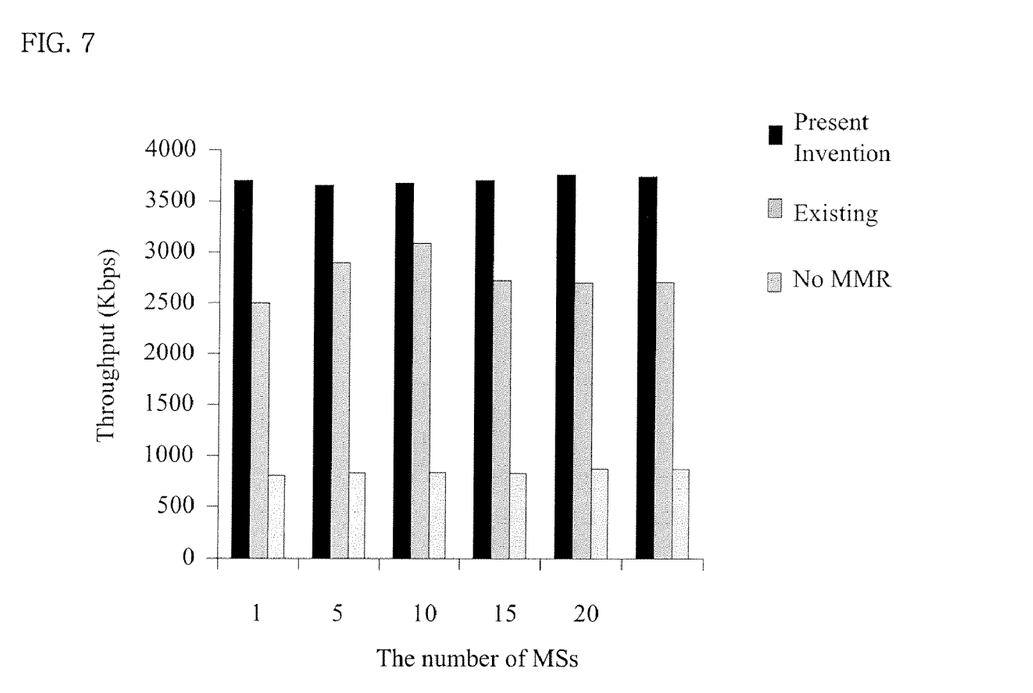
FIG. 7 illustrates the impact of the number of MSs on throughput of the MBS system according to the present invention, the existing MBS system with no RS and the existing MBS system over MMR network.

FIG. 7 illustrates the impact of the number of MSs on throughput of the MBS system according to the present invention, the existing MBS system with no RS and the existing MBS system over MMR network.

It is illustrated that the impact of the number of the MS on throughput in each system is not so significant and throughput of the MBS system according to the present invention is higher and constant.

The hardware devices described above can be configured as one or more software module to execute the operation of the present invention, and vice versa.

While the invention has been shown and described with respect to the preferred embodiments, it will be understood by those skilled in the art that various changes and modification may be made without departing from the spirit and scope of the invention as defined in the following claims.

What is claimed is:

1. A method for Multicast Broadcast Service (MBS) over Mobile Multi-hop Relay (MMR) network using dynamic modification of Modulation and Coding Scheme (MCS) level, comprising:
deciding MCS level for transmission between base station (BS) and relay station (RS);
deciding MCS level for transmission between the RS and mobile station (MS) based on the MCS level for transmission between the BS and the RS; and
transmitting an MCS control message to the RS informing of the MCS level for transmission between the RS and the MS;
wherein said deciding MCS level for transmission between the RS and mobile station (MS) comprises:
calculating spectrum efficiency of the MS (ME) using Equation below based on spectrum efficiency of the RSi (REi) corresponding to the decided MCS level for transmission between the BS and the RS and throughput of the overall MBS system (MBSthr); and
selecting MCS level corresponding to the ME as optimum MCS level for the transmission between the RS and the MS;

$$MBS_{thr} = \left(\sum_{i=o}^{n-1} RB_i + MB\right) \times \left(\frac{1}{ME} + \sum_{i=0}^{n-1} \frac{1}{RE_i}\right)^{-1}$$

where RBi denotes bandwidth for RSi and MB denotes bandwidth for MS, n is a natural number, and i is an integer between 0 and n−1.

2. The method of claim 1,
wherein said deciding the MCS level for the transmission between the BS and the RS comprises:
transmitting test MBS data with a plurality of MCS levels from the BS to the RS; and
measuring throughputs in response to the test MBS data with the plurality of MCS levels, calculating spectrum efficiencies based on the measured throughputs, and selecting the MCS level corresponding to highest spectrum efficiency among spectrum efficiencies of current channel as optimum MCS level for the transmission between the BS and the RS.

3. The method of claim 2,
wherein the decided MCS level for the transmission between the BS and the RS, throughput and spectrum efficiency are recorded in Adaptive Modulation and Coding (AMC) table of the BS, and wherein the AMC table is updated based on the BS's periodical transmission of the test MBS data to the RS and the RS's periodical reports of throughput of channel to the BS.

4. The method of claim 1,
wherein the decided MCS level for the transmission between the RS and the MS, throughput corresponding to the decided MCS level and spectrum efficiency corresponding to the decided MCS level are recorded in Dynamic Modulation and Coding (DMC) table of the BS, and wherein the DMC table is updated upon modification of the MCS level for the transmission between the BS and the RS.

5. The method of claim 1,
wherein the MCS level for the transmission between the RS and the MS is decided such that the sum of spectrum efficiency of the MS (ME) and spectrum efficiency of the RS (RE) is constant.

6. The method of claim 1, further comprising:
gathering channel information through Channel Quality Information Channel (CQICH); and
transmitting MBS data based on the MCS control message.

7. A system for Multicast Broadcast Service (MBS) over Mobile Multi-hop Relay (MMR) network using dynamic modification of Modulation and Coding Scheme (MCS) level, wherein base station (BS) comprises:
Adaptive Modulation and Coding (AMC) table for storing MCS level for transmission between the BS and relay station (RS), throughput corresponding to MCS level, and spectrum efficiency corresponding to the MCS level; and
Dynamic Modulation and Coding (DMC) table for storing MCS level for transmission between the RS and MS to be changed upon update of the AMC table,
and wherein, if there is any change of the MCS level for the transmission between the RS and the MS, the BS transmits a MCS control message to the RS informing of the MCS level change such that MBS data is transmitted with the changed MCS level,
wherein the BS calculates spectrum efficiency of the MS (ME) using Equation below based on spectrum efficiency of the RSi (REi) corresponding to decided MCS level for transmission between the BS and the RS and throughput of overall MBS system (MBSthr); and
selects MCS level corresponding to the ME as optimum MCS level for the transmission between the RS and the MS, $$MBS_{thr} = \left(\sum_{i=o}^{n-1} RB_i + MB\right) \times \left(\frac{1}{ME} + \sum_{i=0}^{n-1} \frac{1}{RE_i}\right)^{-1}$$

where RBi denotes bandwidth for RSi, MB denotes bandwidth for the MS, n is a natural number, and i is an integer between 0 and n−1.

8. The system of claim 7,
wherein the BS transmits test MBS data with a plurality of MCS levels to the RS and selects the MCS level corresponding to highest spectrum efficiency among spectrum efficiencies of current channel based on throughputs measured in response to the test MBS data as optimum MCS level for the transmission between the BS and the RS.

9. The system of claim 7,
wherein the MCS level for the transmission between the RS and the MS is decided such that the sum of ME and spectrum efficiency of the RS (RE) is constant.

* * * * *